(12) United States Patent
Halder et al.

(10) Patent No.: US 6,277,175 B1
(45) Date of Patent: Aug. 21, 2001

(54) METHOD AND APPARATUS FOR REMOVING TRIHALOMETHANES AND DISSOLVED OXYGEN FROM WATER

(75) Inventors: Raghunath Halder, Guelph; Jonathan Lister, Georgetown, both of (CA)

(73) Assignee: Sterling Berkefeld Inc., Guelph (CA)

( * ) Notice: Subject to any disclaimer, the term of this patent is extended or adjusted under 35 U.S.C. 154(b) by 0 days.

(21) Appl. No.: 09/300,155

(22) Filed: Apr. 27, 1999

(51) Int. Cl.[7] .................................................. B01D 19/00
(52) U.S. Cl. .............................. 95/246; 95/245; 95/263; 95/266; 96/157; 210/188; 210/750
(58) Field of Search ......................... 95/243, 245, 246, 95/247, 263, 266, 157, 181, 290; 210/750, 188

(56) References Cited

U.S. PATENT DOCUMENTS

| | | | |
|---|---|---|---|
| H1206 | * 7/1993 | Thibodeaux et al. | 95/211 |
| Re. 35,074 | * 10/1995 | Lamarre | 210/750 |
| 4,352,679 | * 10/1982 | Notardonato et al. | 95/245 |
| 4,565,634 | * 1/1986 | Lydersen | 210/750 |
| 4,869,832 | * 9/1989 | Lamarre | 210/750 |
| 4,892,664 | 1/1990 | Miller | 210/188 |
| 5,004,484 | 4/1991 | Stirling et al. | 95/263 |
| 5,383,958 | * 1/1995 | Battaglia | 96/188 |
| 5,389,126 | 2/1995 | Baker et al. | 95/263 |
| 5,470,478 | 11/1995 | Leva | 96/155 |
| 5,490,941 | * 2/1996 | Miyabe et al. | 210/673 |
| 5,766,321 | * 6/1998 | Ishihara et al. | 95/263 |

OTHER PUBLICATIONS

"Tower Packings", Product Literature, U.S. Stoneware, p. 10, 1957.*

* cited by examiner

*Primary Examiner*—Duane Smith
*Assistant Examiner*—Jason M. Greene
(74) *Attorney, Agent, or Firm*—Brinks Hofer Gilson & Lione

(57) ABSTRACT

A method for removing THMs and dissolved oxygen from water, including supplying the water into an upper portion of an air stripping container, passing the water generally downward toward a lower portion and through a first packing material, introducing air into the lower portion for flow generally upward toward the upper portion and generally against the flow of the water whereby at least some THMs undergo a phase change from liquid to gas and are carried generally upward with the air, supplying the water to an upper region of a vacuum degassing container, passing the water generally downward toward a lower region and through a second packing material, and dispensing the water from the lower region. An apparatus including an air stripping container connectable to the water, for flow generally downward through a first packing material, an air blower for providing air flow generally upward through the first packing material against flow of the water, a vacuum degassing container disposed in fluid connection with the air stripping container, a second packing material disposed within the vacuum degassing container, and a vacuum pump for providing a partial vacuum within the vacuum degassing container, whereby at least some dissolved oxygen can be removed from the water.

19 Claims, 1 Drawing Sheet

METHOD AND APPARATUS FOR REMOVING TRIHALOMETHANES AND DISSOLVED OXYGEN FROM WATER

BACKGROUND OF THE INVENTION

1. Field of the Invention

The present invention relates generally to methods and apparatus for removing trihalomethanes and dissolved oxygen from water in order to render the water potable, and more particularly relates to methods and apparatus for continuously removing trihalomethanes and dissolved oxygen from water prior to using the water to make beverages.

2. Description of the Prior Art

In a typical water treatment system for potable water, the water is disinfected with chlorine. The organics present in water can react with chlorine to form trihalomethanes, among other products. The trihalomethanes (THMs) that are formed during chlorine disinfection of water are chloroform ($CHCl_3$), bromodichloromethane ($CHCl_2Br$), dibromochloromethane ($CHClBr_2$) and bromoform ($CHBr_3$). These trihalomethanes are known to be carcinogenic in nature. For the water to be potable, the concentration of trihalomethanes in the water must be very low. Currently, the maximum concentration of trihalomethanes in drinking water that is permitted by regulation is 100 $\mu$g/lit (ppb), both in Canada and the United States (Environment Canada and U.S. Safe Drinking Water Act). However, it appears that in the near future this permissible concentration will be reduced further.

In the beverage industry, the concentration of trihalomethanes in the products is maintained at a level well below the value currently regulated by the federal laws. A typical action level for beverages is 80 ppb or lower. Currently the trihalomethanes from the beverage water are removed by adsorption on activated carbon. The activated carbon also removes residual chlorine. However, the lifetime of an activated carbon bed is much greater when it is used only in dechlorination, rather than both dechlorination and trihalomethane adsorption.

When activated carbon is used to remove trihalomethanes, the carbon bed becomes saturated with trihalomethanes quite quickly. The bed can be regenerated by steaming. Depending on the amount of trihalomethanes in the inlet water and the action level of trihalomethanes in the product water, the carbon bed can require frequent steaming. A large amount of steam is needed in each regeneration of the carbon bed. Further, after some definite number of times of regeneration, the whole carbon bed must be replaced by fresh carbon. On the other hand, if the carbon bed is used solely for the removal of merely chlorine, a carbon tower can typically last several years.

Apparatus for the continuous removal of volatile organic halogenated compounds from a liquid such as water are known, for example, from U.S. Pat. Nos. 4,892,664; 5,004,484; 5,470,478; 5,490,941; and Re. 35,074. A batch process for the removal of volatile organic halogenated compounds from a liquid such as water is known, for example, from U.S. Pat. No. 5,389,126, which could be made to be a continuous process. The disclosed apparatus generally addresses environmental concerns and none is disclosed to be employed in the purification of water for use in the preparation of beverages. Likewise, dissolved oxygen removal systems are known, for example, from U.S. Pat. Nos. 4,565,634; 5,383,958; and 5,766,321, however, no such apparatus is disclosed in combination with apparatus for removing volatile organic halogenated compounds from water.

SUMMARY OF THE INVENTION

In order to aid in the understanding of the present invention, it can be stated in essentially summary form that it is directed to methods and apparatus for removing trihalomethanes (THMs) and dissolved oxygen from water.

More specifically, the apparatus of the present invention includes an air stripping container having an upper portion defining a liquid inlet orifice and a lower portion defining a liquid outlet orifice and a blow air orifice. An air outlet is defined through the air stripping container at the upper portion. Disposed within the air stripping container is a first packing material, disposed generally between the liquid inlet orifice and the liquid outlet orifice and supported on a first packing material support plate. An air blower is disposed in fluid connection with blow air orifice, so that air flow can be provided generally upward through the air stripping container and through the first packing material. Liquid having THMs therein is supplied to the upper portion at the liquid inlet orifice by a supply pump. The supplied liquid is distributed generally uniformly over the cross-sectional area of the air stripping container by a liquid distributor, and wall wipers are disposed at intervals along the interior of the air stripping container. In addition, a mist eliminator is provided within the upper portion. The air blower provides air flow generally upward against the flow of liquid having THMs therein whereby at least some THMs are removed from the liquid as THMs undergo a phase change from liquid to gas and are carried upward with the air, and oxygen is dissolved into the liquid from the air.

The apparatus further includes a vacuum degassing container having an upper region defining a vacuum orifice and a liquid inlet aperture, and a lower region defining a liquid outlet aperture. Disposed within the vacuum degassing container generally between the liquid inlet aperture and the liquid outlet aperture is a second packing material, supported on a second packing material support plate. A transfer pump is disposed in fluid connection between the liquid outlet orifice of the air stripping container and the liquid inlet aperture of the vacuum degassing container, for pumping liquid from which at least some THMs have been removed from the air stripping container to the vacuum degassing container. Liquid is then distributed generally uniformly over the cross-sectional area of the upper region of the vacuum degassing container by a second liquid distributor, and a second mist eliminator is disposed within the other region above the second liquid distributor. A vacuum pump is disposed in fluid connection with the vacuum orifice of the vacuum degassing container, providing a partial vacuum within degassing container so that at least some dissolved oxygen can be removed from the liquid flowing generally downward through the vacuum degassing container.

The flow of liquid through the apparatus at a preselected rate can be controlled by a control means connected to an air stripping container liquid level transmitter and a vacuum degassing container liquid level transmitter, the supply pump, and the transfer pump.

Liquid from which at least some THMs and dissolved oxygen has been removed can be dispensed from the vacuum degassing container through an outlet pump disposed in fluid connection with the liquid outlet aperture.

Apparatus according to the present invention operating on water at a temperature of 25° C. and at flow rates of between about 900 and 1900 liters per minute lowered the THM concentration more than an order of magnitude below current standards to less than 3 parts per billion while lowering the dissolved oxygen concentration to about 1 part per million.

The following portion of the specification, taken in conjunction with the drawing, sets forth the preferred embodiment of the present invention. The embodiment of the invention disclosed herein is the best mode contemplated by the inventors for carrying out the invention in a commercial environment, although it should be understood that various modifications can be accomplished within the parameters of the present invention.

DETAILED DESCRIPTION OF THE PREFERRED EMBODIMENT

Figure 1:
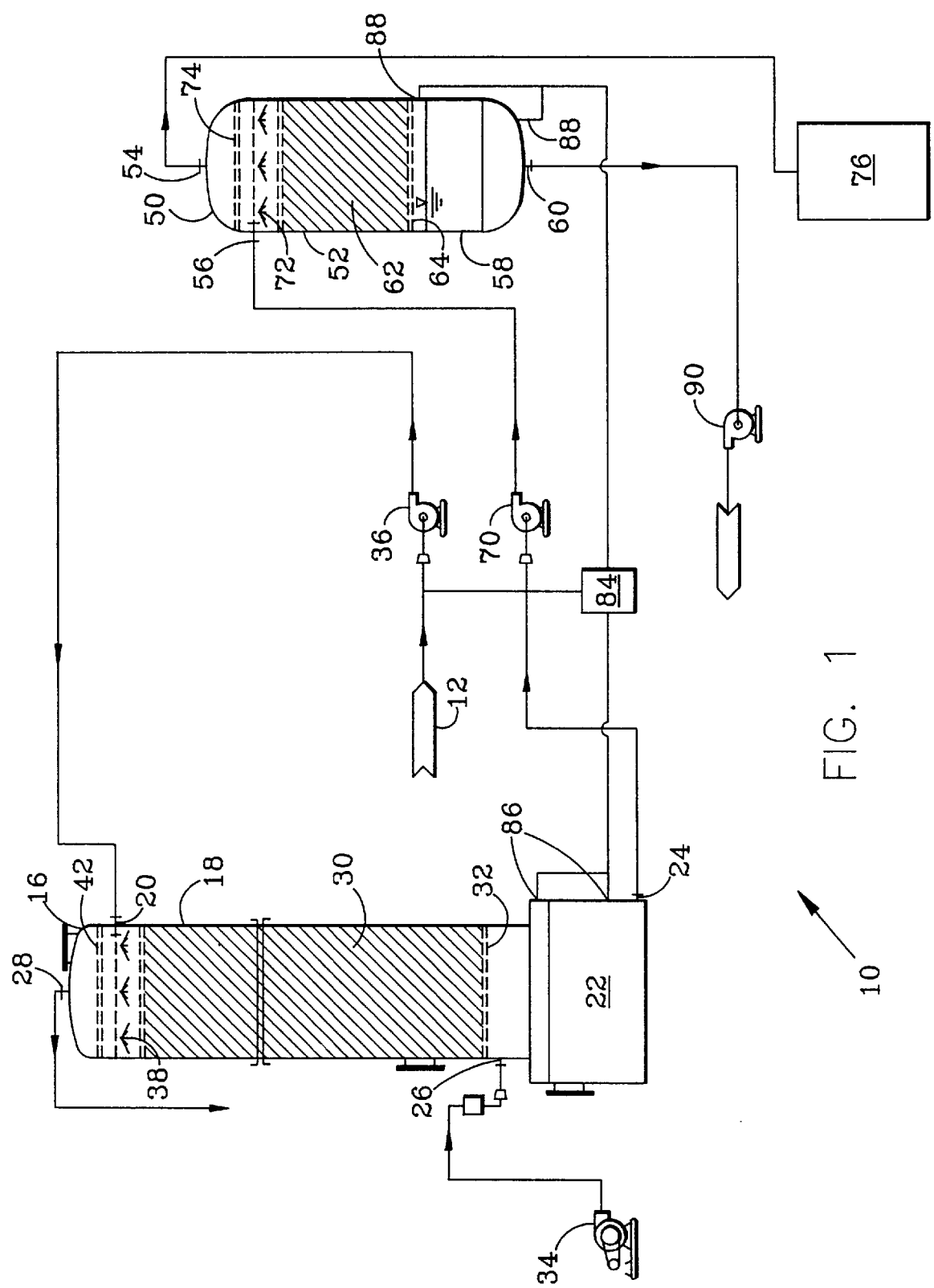
FIG. 1 is a schematic representation of an apparatus for removing trihalomethanes and dissolved oxygen from water of the present invention.

FIG. 1 depicts an apparatus 10 of the present invention for removing trihalomethanes (THMs) and dissolved oxygen from a liquid, such as water having THMs therein, where the liquid can have its source in a raw liquid supply 12. The apparatus 10 includes an air stripping container 16 having an upper portion 18 defining a liquid inlet orifice 20, and a lower portion 22 defining a liquid outlet orifice 24 and a blow air orifice 26. An air outlet 28 is defined through the air stripping container 16 at the upper portion 18. A first packing material 30 is generally disposed between the liquid inlet orifice 20 and the liquid outlet orifice 24 within the air stripping container 16 supported by a first packing material support plate 32. In a preferred embodiment, the first packing material 30 can be polypropylene Pall rings of approximately 2.5 cm in size, or any packing material with similar mass transfer characteristics. The mass transfer characteristics of importance are the number of elements per unit volume and the surface area per unit volume. The packing material 30 should generally have a surface area of between about 100 $m^2/m^3$ and 300 $m^2/m^3$. Preferably, between about 45,000 and 100,000 packing material elements per cubic meter should be situated in the air stripping container 16.

An air blower 34 is disposed in fluid connection with the blow air orifice 26, whereby air flow can be provided generally upward through the air stripping container 16 and through the first packing material 30.

A supply pump 36 supplies liquid having THMs therein to the upper portion 18 at the liquid inlet orifice 20. A liquid distributor 38 distributes the supplied liquid generally uniformly over the entire cross-sectional area of the air stripping container 16. Wall wipers are disposed at intervals along the interior surface of the air stripping container 16 to minimize channeling of liquid passing through the air stripping container 16. Further, a mist eliminator 42 is provided within the upper portion 18 to minimize liquid mist from exiting from the air stripping container 16 with the air.

As noted, the air blower 34 provides air flow generally upward, against the generally downward flow of liquid having THMs therein. At least some THMs are removed from the liquid as THMs undergo a phase change from liquid to gas, and are carried upward with the air and out through air outlet 28.

The amount of first packing material 30 within air stripping container 16 necessary to remove a desired amount of THMs is dependent upon a number of factors, including the concentration of THMs in the liquid, the composition of the THMs in terms of individual components, and water temperature. In a preferred embodiment, a supply pump 36 is used to supply liquid at a flux rate from about 40 $m^3/(m^2\text{-hr})$ to about 60 $m^3/(m^2\text{-hr})$. An air blower 34 is used to provide a volume to volume, air to liquid ratio from about 50:1 to about 100:1 in upper portion 18.

The apparatus 10 further includes a vacuum degassing container 50 having an upper region 52 defining a vacuum orifice 54 and a liquid inlet aperture 56, and a lower region 58 defining a liquid outlet aperture 60. Disposed within the vacuum degassing container 50 generally between the liquid inlet aperture 56 and the liquid outlet aperture 60 is a second packing material 62, held on a second packing material support plate 64. The second packing material 62 can be the same as or different from the first packing material 30. The second packing material can generally have the same range of mass transfer characteristics as the first packing material. Again, 2.5 cm polypropylene Pall rings are preferably employed as the second packing material 62.

A transfer pump 70 is disposed in fluid connection between the liquid outlet orifice 24 of the air stripping container 16 and the liquid inlet aperture 56 of the vacuum degassing container 50, for pumping liquid from which at least some THMs have been removed from the air stripping container 16 into the vacuum degassing container 50. The second liquid distributor 72 distributes liquid from which at least some THMs have been removed uniformly over the cross-section of the upper region 52 of the vacuum degassing container 50. A second mist eliminator 74 is disposed within the upper region 52, above the second liquid distributor 72.

A vacuum pump 76 is disposed in fluid connection with the vacuum orifice 54 of the vacuum degassing container 50, whereby a partial vacuum is provided within the vacuum degassing container 50 so that at least some dissolved oxygen can be removed from the liquid flowing generally downward through the vacuum degassing container 50. In a preferred embodiment, the liquid flux through the vacuum degassing container 50 is from about 50 $m^3/(m^2\text{-hr})$ to about 75 $m^3/(m^2\text{-hr})$. The vacuum pump 76 achieves a partial vacuum of between 30 mm of Hg absolute to about 55 mm of Hg absolute within the vacuum container 50.

The flow of liquid through apparatus 10 at a preselected rate can be controlled by a control means 84, connected to an air stripping container liquid level transmitter 86 and a vacuum degassing container liquid level transmitter 88, the supply pump 36, and the transfer pump 70.

Liquid from which at least some THMs and dissolved oxygen has been removed can be dispensed from the vacuum degassing container 50 through an outlet pump 90 disposed in fluid connection with the liquid outlet aperture 60.

The present invention having been described in its preferred embodiment, it is clear that the present invention is susceptible to numerous modifications and embodiments within the ability of those skilled in the art and without exercise of the inventive facility. Accordingly, the scope of the present invention is defined as set forth by the scope of the following claims.

What is claimed is:

1. A method for removing trihalomethanes (THMs) and dissolved oxygen from a liquid, comprising the steps of:
   supplying a liquid having THMs therein to be removed into an upper portion of an air stripping container;
   passing the liquid having THMs therein generally downward toward a lower portion of the air stripping container and through a first packing material disposed within the air stripping container;
   introducing air into the lower portion for flow generally upward toward the upper portion and generally against flow of the liquid having THMs therein whereby at least some THMs undergo a phase change from liquid to gas and are carried generally upward with the air;

supplying liquid from which at least some THMs have been removed from the lower portion to an upper region of a vacuum degassing container;

passing the liquid from which at least some THMs have been removed generally downward toward a lower region of the vacuum degassing container and through a second packing material disposed within the vacuum degassing container;

creating a partial vacuum within the vacuum degassing container whereby at least some dissolved oxygen present within the liquid from which at least some THMs have been removed is removed as the liquid from which at least some THMs have been removed flows through the second packing material; and dispensing liquid from which at least some THMs and dissolved oxygen have been removed from the lower region of the vacuum degassing container.

2. The method as recited in claim 1, wherein the step of introducing air into the lower portion includes providing air at a volume ratio to the liquid having THMs therein of between about 50:1 to about 100:1.

3. The method as recited in claim 1, wherein the step of creating a partial vacuum includes creating a vacuum of between about 30 mm Hg absolute to about 55 mm Hg absolute.

4. The method as recited in claim 1, wherein the step of passing the liquid having THMs therein through the first packing material includes passing the liquid having THMs therein through a packing material present in an amount of between about 45,000 and 100,000 elements per cubic meter, the elements generally having a surface area of between about 100 $m^2/m^3$ and 300 $m^2/m^3$.

5. The method as recited in claim 1, wherein the step of passing the liquid from which at least some THMs have been removed through the second packing material includes passing the liquid from which at least some THMs have been removed through a packing material present in an amount of between about 45,000 and 100,000 elements per cubic meter, the elements generally having a surface area of between about 100 $m^2/m^3$ and 300 $m^2/m^3$.

6. The method as recited in claim 1, wherein:

the step of supplying a liquid having THMs therein includes pumping the liquid having THMs therein into the air stripping container utilizing a supply pump disposed in fluid connection between a source of the liquid having THMs therein and a liquid inlet orifice defined by the air stripping container;

the step of supplying liquid from which at least some THMs have been removed includes pumping the liquid from which at least some THMs have been removed into the vacuum degassing container utilizing a transfer pump disposed in fluid connection between a liquid outlet orifice defined by the air stripping container and a liquid inlet aperture defined by the vacuum degassing container; and the step of dispensing liquid from which at least some THMs and dissolved oxygen have been removed includes pumping the liquid from which at least some THMs and dissolved oxygen have been removed utilizing an outlet pump disposed in fluid connection with a liquid outlet aperture defined by the vacuum degassing container.

7. The method as recited in claim 6, further comprising the step of controlling the supply pump and the transfer pump so that liquid flows through the air stripping container and the degassing container at a preselected rate.

8. A method for removing trihalomethanes (THMs) and dissolved oxygen from a liquid, comprising the steps of:

supplying a liquid having THMs therein to be removed into an upper portion of an air stripping container, including pumping the liquid having THMs therein into the air stripping container utilizing a supply pump disposed in fluid connection between a source of the liquid having THMs therein and a liquid inlet orifice defined by the air stripping container;

passing the liquid having THMs therein generally downward toward a lower portion of the air stripping container and through a first packing material disposed within the air stripping container;

introducing air into the lower portion for flow generally upward toward the upper portion and generally against flow of the liquid having THMs therein at a volume ratio to the liquid having THMs therein of between about 50:1 to about 100:1 whereby at least some THMs undergo a phase change from liquid to gas and are carried generally upward with the air;

supplying liquid from which at least some THMs have been removed from the lower portion to an upper region of a vacuum degassing container, including pumping the liquid from which at least some THMs have been removed into the vacuum degassing container utilizing a transfer pump disposed in fluid connection between a liquid outlet orifice defined by the air stripping container and a liquid inlet aperture defined by the vacuum degassing container;

passing the liquid from which at least some THMs have been removed generally downward toward a lower region of the vacuum degassing container and through a second packing material disposed within the vacuum degassing container;

creating a partial vacuum within the vacuum degassing container whereby at least some dissolved oxygen present within the liquid from which at least some THMs have been removed is removed as the liquid from which at least some THMs have been removed flows through the second packing material;

dispensing liquid from which at least some THMs and dissolved oxygen have been removed from the lower region of the vacuum degassing container, including pumping the liquid from which at least some THMs and dissolved oxygen have been removed utilizing an outlet pump disposed in fluid connection with a liquid outlet aperture defined by the vacuum degassing container; and controlling the supply pump and the transfer pump so that liquid flows through the air stripping container and the degassing container at a preselected rate.

9. The method as recited in claim 8, wherein the step of creating a partial vacuum includes creating a vacuum of between about 30 mm Hg absolute to about 55 mm Hg absolute.

10. The method as recited in claim 8, wherein the step of passing the liquid having THMs therein through the first packing material includes passing the liquid having THMs therein through a packing material present in an amount of between about 45,000 and 100,000 elements per cubic meter, the elements generally having a surface area of between about 100 $m^2/m^3$ and 300 $m^2/m^3$, and the step of passing the liquid from which at least some THMs have been removed through the second packing material includes passing the liquid from which at least some THMs have been removed through packing material present in an amount of between about 45,000 and 100,000 elements per cubic meter, the elements generally having a surface area of between about 100 $m^2/m^3$ and 300 $m^2/m^3$.

11. An apparatus for removing trihalomethanes (THMs) and dissolved oxygen from a liquid, comprising:

an air stripping container having an upper portion defining a liquid inlet orifice and a lower portion defining a liquid outlet orifice and a blow air orifice, the liquid inlet orifice connectable to a source of liquid having THMs therein for flow generally downward toward the liquid outlet orifice;

a supply pump disposed in fluid connection between the source of liquid having THMs therein and the liquid inlet orifice, for supplying liquid having THMs therein to the air stripping container;

a first packing material disposed within the air stripping container and generally between the liquid inlet orifice and the liquid outlet orifice;

an air blower disposed in fluid connection with the blow air orifice for providing air flow generally upward through the first packing material, against flow of the liquid having THMs therein and toward the upper portion, whereby at least a portion of the THMs can undergo a phase change from liquid to gas and are carried generally upward with the air;

a vacuum degassing container having an upper region defining a vacuum orifice and a liquid inlet aperture disposed in fluid connection with the liquid outlet orifice, and a lower region defining a liquid outlet aperture, whereby liquid from which at least some THMs have been removed can flow from the air stripping container into the vacuum degassing container and toward the lower region;

a transfer pump disposed in fluid connection between the liquid outlet orifice and the liquid inlet aperture, for pumping liquid from which at least some THMs have been removed from the air stripping container to the vacuum degassing container;

a second packing material disposed within the vacuum degassing container and generally between the liquid inlet aperture and the liquid outlet aperture;

a vacuum pump disposed in fluid connection with the vacuum orifice for providing a partial vacuum within the vacuum degassing container whereby at least some dissolved oxygen can be removed from the liquid from which at least some THMs have been removed, and liquid from which at least some THMs and dissolved oxygen have been removed can be dispensed through the liquid outlet aperture; and control means connected to the supply pump and the transfer pump for and including an air stripping container liquid level transmitter and a vacuum degassing container liquid level transmitter for providing a flow of liquid through the apparatus at a preselected rate.

12. The apparatus as recited in claim 11, wherein the first packing material includes polypropylene Pall rings.

13. The apparatus as recited in claim 11, wherein the second packing material includes polypropylene Pall rings.

14. The apparatus as recited in claim 11, wherein the air blower is capable of providing air flow at a volume ratio to the liquid having THMs therein of about 50:1 to about 100:1.

15. The apparatus as recited in claim 11, wherein the vacuum pump is capable of creating a partial vacuum of between about 30 mm Hg absolute to about 55 mm Hg absolute.

16. The apparatus as recited in claim 11, further comprising:

an outlet pump disposed in fluid connection with the liquid outlet aperture for dispensing liquid from which at least some THMs and dissolved oxygen has been removed.

17. An apparatus for removing trihalomethanes (THMs) and dissolved oxygen from a liquid, comprising:

an air stripping container having an upper portion defining a liquid inlet orifice and a lower portion defining a liquid outlet orifice and a blow air orifice, the liquid inlet orifice connectable to a source of liquid having THMs therein for flow generally downward toward the liquid outlet orifice;

a first packing material disposed within the air stripping container and generally between the liquid inlet orifice and the liquid outlet orifice;

an air blower disposed in fluid connection with the blow air orifice for providing air flow generally upward through the first packing material, against flow of the liquid having THMs therein and toward the upper portion, the air blower capable of providing air flow at a volume ratio to the liquid having THMs therein of about 50:1 to about 100:1, whereby at least a portion of the THMs can undergo a phase change from liquid to gas and are carried generally upward with the air;

a vacuum degassing container having an upper region defining a vacuum orifice and a liquid inlet aperture disposed in fluid connection with the liquid outlet orifice, and a lower region defining a liquid outlet aperture, whereby liquid from which at least some THMs have been removed can flow from the air stripping container into the vacuum degassing container and toward the lower region;

a second packing material disposed within the vacuum degassing container and generally between the liquid inlet aperture and the liquid outlet aperture;

a vacuum pump disposed in fluid connection with the vacuum orifice for providing a partial vacuum within the vacuum degassing container whereby at least some dissolved oxygen can be removed from the liquid from which at least some THMs have been removed, and liquid from which at least some THMs and dissolved oxygen have been removed can be dispensed through the liquid outlet aperture;

a supply pump disposed in fluid connection between the source of liquid having THMs therein and the liquid inlet orifice, for supplying liquid having THMs therein to the air stripping container;

a transfer pump disposed in fluid connection between the liquid outlet orifice and the liquid inlet aperture, for pumping liquid from which at least some THMs have been removed from the air stripping container to the vacuum degassing container;

control means connected to the supply pump and the transfer pump and including an air stripping container liquid level transmitter and a vacuum degassing container liquid level transmitter, for providing a flow of liquid through the apparatus at a preselected rate; and an outlet pump disposed in fluid connection with the liquid outlet aperture for dispensing liquid from which at least some THMs and dissolved oxygen has been removed.

18. The apparatus as recited in claim 17, wherein the first packing material includes polypropylene Pall rings, and the second packing material includes polypropylene Pall rings, the Pall rings being present in an amount of between about 45,000 and 100,000 elements per cubic meter, the Pall rings generally having a surface area of between about 100 $m^2/m^3$ and 300 $m^2/m^3$.

19. The apparatus as recited in claim 17, wherein the vacuum pump is capable of creating a partial vacuum of between about 30 mm Hg absolute to about 55 mm Hg absolute.

* * * * *